United States Patent Office 3,550,474
Patented Dec. 29, 1970

3,550,474
TRANSMISSION AND FINAL DRIVE UNITS
Jean Maurice and Jean Piret, Billancourt, France, assignors to Regie Nationale des Usines Renault, Billancourt, Hauts-de-Seine, and Automobiles Peugeot, Paris, France
Filed Nov. 12, 1968, Ser. No. 774,652
Claims priority, application France, Dec. 5, 1967, 130,961; July 3, 1968, 157,656
Int. Cl. F16h 57/02
U.S. Cl. 74—606                          7 Claims

ABSTRACT OF THE DISCLOSURE

A transmission and final drive unit for an automotive vehicle, having a composite casing and characterised in that it comprises a transmission casing and a final drive casing assembled along a joint plane extending at right angles to the longitudinal axis of the unit, and that the final drive casing comprises two sections of which the inherent joint plane comprises said longitudinal axis.

---

This invention relates to automotive transmissions and has specific reference to transmission and final drive units.

As a rule, the problem of transmission and final drive or differential units for automotive vehicles, which units are usually referred to as gearbox-and-differential units, is solved in two general ways:

Firstly, the construction is designed to comprise two or three main casing elements or sections assembled along joint planes extending at right angles to the longitudinal axis of the assembly; and Secondly, the construction is such that the component elements are enclosed mainly in two half-casings of which the joint plane contains the longitudinal axis.

With casings of the first type it is not possible to incorporate certain particularly advantageous solutions in connection with automotive transmissions of the layshaft type, such as the mounting of gears having a diameter greater than the outer diameter of the bearings and their supports or housings.

With casings of the second type it is not possible to separate sub-assemblies, such as the transmission or gearbox subassembly of the complete transmission system, for constituting another transmission with a different differential mechanism.

The present invention is concerned with the construction of a composite casing unit of the type broadly set forth hereinabove, whereby the above-mentioned inconveniences are eliminated, that is, the above-mentioned advantages are preserved. This construction is being characterised in that it comprises a transmission or gearbox casing and a final drive casing assembled to each other along a joint plane extending at right angles to the longitudinal axis of the unit, the final drive casing further comprising two sections having an inherent joint plane comprising said longitudinal axis.

This invention is also concerned wth a specific form of embodiment of the aforesaid final drive casing which provides a particularly interesting and economical solution to the problem of sound-insulating the transmission, final drive and clutch unit, especially when using a hydraulic coupling. Transmission or final drive casings are already known which are sound-proofed by using inner stiffening partitions, flanges or ribs having their joint planes disposed at right angles to the longitudinal axis and which are formed with an extension surrounding the engine-to-transmission coupling device, for example a clutch or hydraulic coupling or torque converter, but this construction is rather expensive and involves heavy initial investments for its industrial manufacture.

The construction according to this invention is characterised in that the above-defined final drive casing is so designed that it can be secured to the engine crankcase so as to enclose the device, such as torque converter, coupling or clutch, inter-connecting the engine and the transmission, and that it comprises reinforcing ribs distributed along the whole or nearly the whole of its length.

In fact, bench tests made with a torque converter showed that at certain engine speeds the casing of this converter is caused to vibrate at only some portions of its surface area.

The above mentioned reinforcing or stiffening partitions, flanges and/or ribs according to the present invention increase considerably the rigidity of the casing enclosing the torque converter of which the inherent vibration frequency, in many designs, attains values higher than the excitation frequencies generated by the engine rotation or by the converter impulses, thus reducing considerably the vibration amplitude and therefore the sound level of said casing.

Moreover, it is advantageous to position these ribs on the casing portion surrounding the converter in order to further increase the general stiffness of the casing, an increment hardly obtainable otherwise without detrimentally increasing the casing mass, the thickness of the casing being limited by reasons of ease of manufacture, weight, inherent frequency and cost.

In addition of the advantages mentioned hereinabove, the two-section differential or final drive casing is advantageous on account of:

the more economical manufacture of castings,
a simple arrangement and a convenient mounting or assembling of various component elements in the casing, for which the two half-housings are formed in the two casing sections.

Typical forms of embodiment of a transmission and final drive unit according to this invention will now be described by way of example with reference to the attached drawing, in which.

Figure 1:
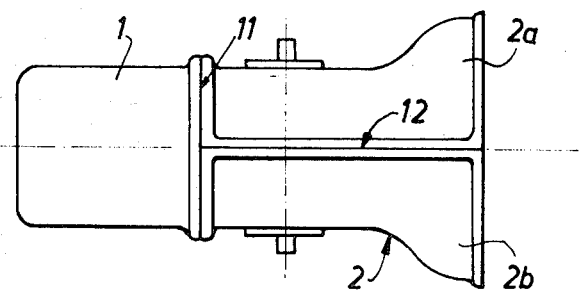
FIG. 1 is a plan view from above showing a transmission and final drive casing according to this invention.
Figure 2:
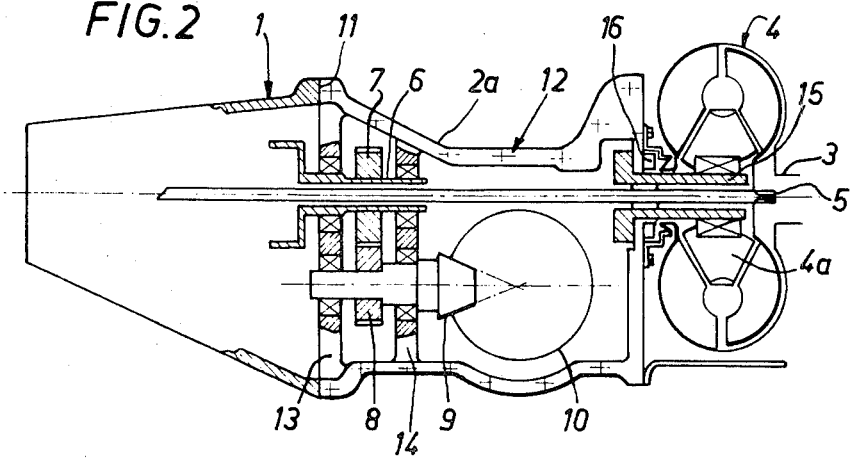
FIG. 2 is a view showing in fragmentary section, on a larger scale, a casing of the above-defined type, the section being taken in the axial plane comprising the joint of the final drive casing, with some component elements of the transmission shown in diagrammatic view.

The transmission and final drive illustrated in FIGS. 1 and 2 comprises a change-speed or gearbox casing 1 and a final drive casing 2 incorporated in a transmission system of which the power unit, disposed as conventional on the side opposite to the gearbox side with respect to the final drive, is shown diagrammatically in FIG. 2 in the form of an engine output shaft or crankshaft end 3 driving through the medium of a hydraulic coupling or torque converter 4 a transmission input shaft 5 extending through the final drive casing. The transmission or change-speed mechanism, housed completely in the casing 1 and not illustrated since it may be of any suitable and known type, comprises an output shaft 6 projecting into the final drive casing, in this example in the form of a tubular shaft surrounding the input shaft 5, for driving through a pair of gears or pinions 7, 8 the input or driving bevel pinion 9 of the final drive bevel gearing comprising a crown wheel shown only diagrammatically at 10.

The transmission casing 1 comprises a main section or member connected to the final drive casing 2 through a joint plane 11 disposed at right angles to the longitudinal axis of the assembly, the final drive casing 2 consisting on the other hand of two sections or halves 2a, 2b having a common joint plane 12 comprising said longitudinal axis. At least one of said casing sections 2a, 2b comprises two inner partitions 13, 14 constituting ball-bearing supports or housings for mounting the output shaft 6 carrying one intermediate pinion or gear 7 and for supporting the shaft of driving pinion 9 rigid with the other intermediate pinion or gear 8.

Stress may be laid on the fact that the transmission mechanism and its casing will thus constitute an important sub-assembly of the transmission and final drive unit, which can easily be detached from this unit and also used, if desired, as a whole with another differential or final drive sub-assembly. Under these conditions the transmission mechanism and its casing may constitute a standard sub-assembly adapted to be associated indifferently with a final drive casing for a front-drive or a rear-engined vehicle.

In addition, the fact that the final drive casing is made of two sections or halves permits incoporating therein gears such as the intermediate gears 7, 8 having a diameter greater than the outer diameter of the corresponding bearings. Thus, different final drive ratios can be obtained in a simple yet economical manner by replacing the gear couple 7, 8 with another gear couple.

In fact, it is well known in the art that, for certain specific applications, mass-produced vehicles are equipped with different final drives and this solution involves the manufacture of a plurality of relatively expensive bevel gearings. With the above-described layshaft arrangement the final drive ratio can be modified by simply changing the pair of helical gears 7, 8 obviously cheaper than the bevel gearing, so that a vehicle better adapted for certain specific conditions of operation than the mass-produced vehicle can be obtained by using a plurality of gear couples 7, 8.

Figure 3:
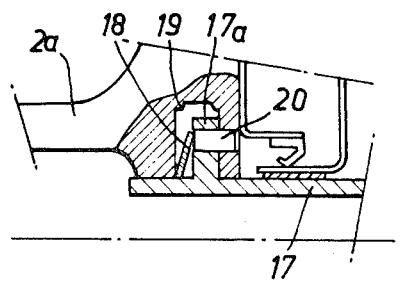
FIG. 3 is a detail view showing an advantageous mounting permitted by the final drive casing of this invention.

The construction of a final drive casing made of two sections is also advantageous in that it facilitates the mounting of the differential while permitting the use of convenient and advantageous solutions in the mechanical construction of the transmission, as illustrated by way of example in FIG. 3, in comparison with FIG. 2, in connection with the mounting of the shaft 4α of the input converter reactor. Thus, according to the conventional arrangement illustrated in FIG. 2 the reaction bearing 15 of the reactor freewheel is secured to the final drive casing by means of screws 16. According to the solution permitted by the present invention and as illustrated in FIG. 3 the reaction bearing 17 of the reactor freewheel comprises a flange 17a engageable with a dished washer 18 in semi-circular recesses 19 formed in the pair of casing sections, so as to enclose same when assembling these casing sections, and the shaft 17 is locked against rotation by means of a pin 20 engaging a hole formed in the corresponding casing flange. This solution is attended by a reduction in the axial dimension of the assembly.

Figure 4:
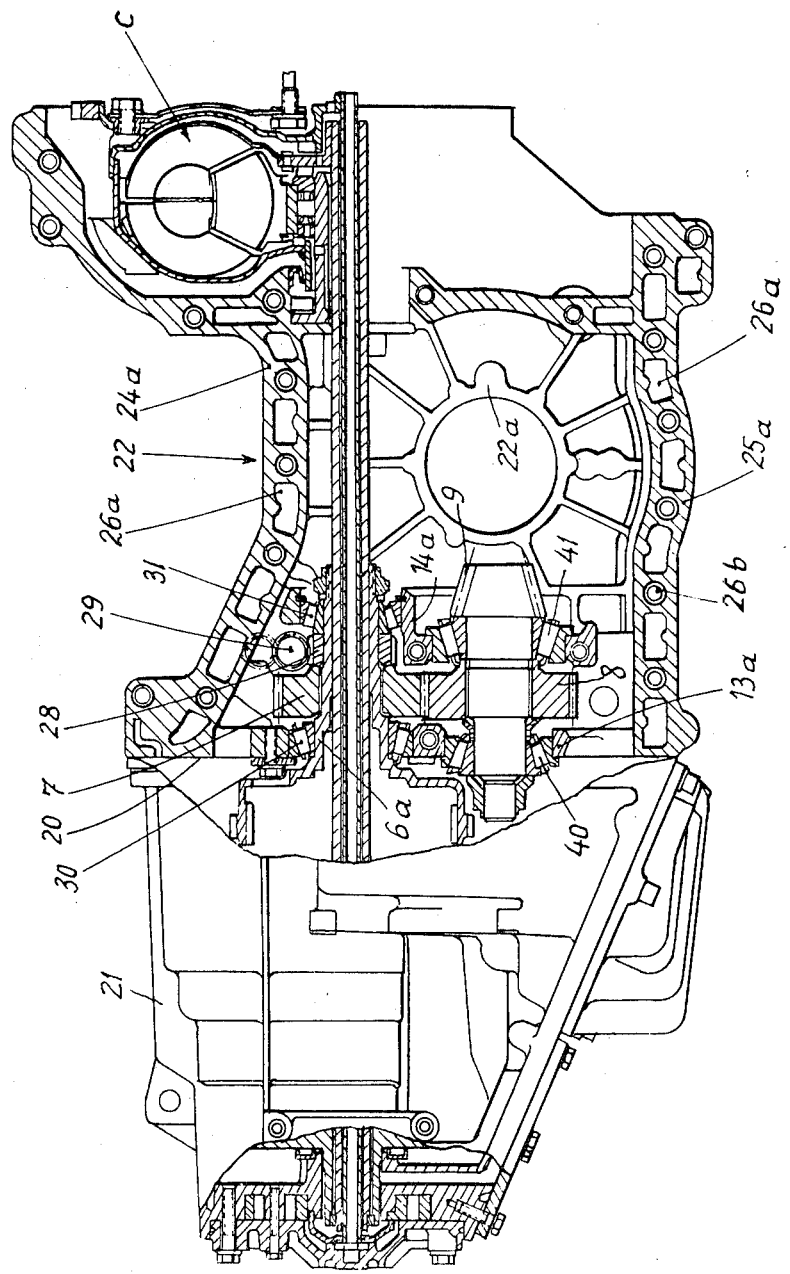
FIG. 4 is a fragmentary longitudinal section taken along the line 4—4 of FIG. 6 showing a transmission and final drive unit comprising an input converter.
Figure 6:
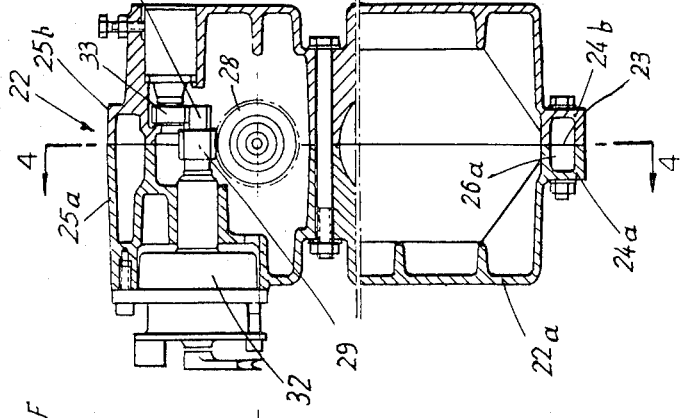
FIG. 6 is a section taken along the line 6—6 of FIG. 5.
Figure 5:
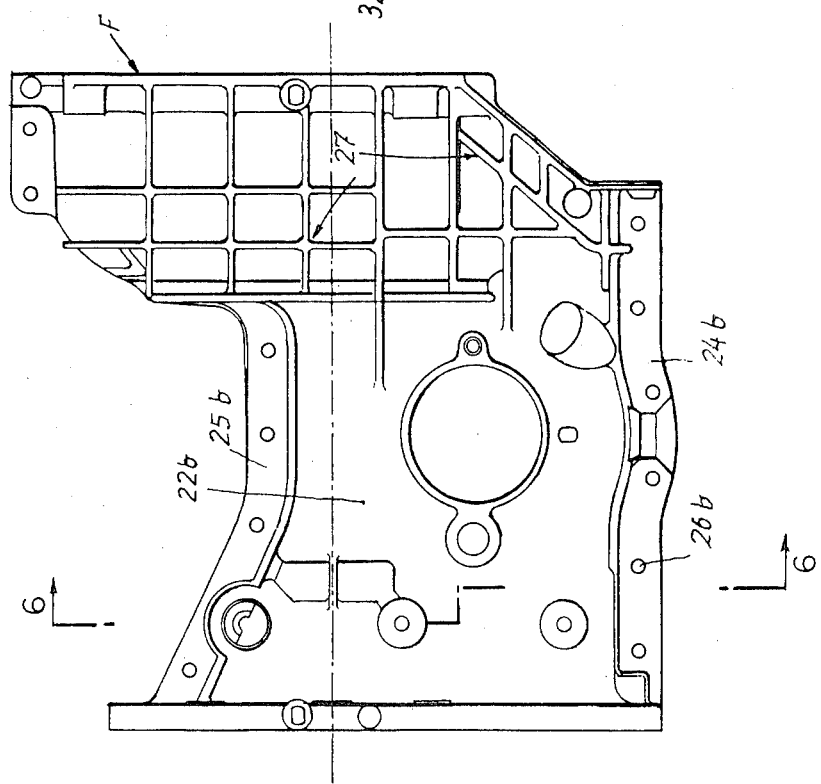
FIG. 5 is a side elevational view of the final drive casing.

In the alternate form of embodiment illustrated in FIGS. 4 to 6 the reference numeral 21 designates the transmission casing connected through a joint plane 20 perpendicular to the longitudinal axis of the assembly to the final drive casing 22 consisting of two casing halves or sections 22a, 22b.

These two casing sections have a longitudinal joint plane 23 on either side of which two reinforcing longitudinal ribs 24a, 25a in one section and 24b, 25b in the other section are provided. According to an arrangement preferred for reasons of constructional simplicity and weight, these ribs are formed with recesses 26a cast integrally therewith and opening on the joint plane, as shown in FIGS. 4 and 6, and disposed between solid portions of said ribs which are formed with passage holes 26b for receiving the casing section assembly bolts.

Moreover, external reinforcing ribs designated generally by the reference numeral 27 in FIG. 5 are provided on the casing sections incorporating the input converter as partially shown in FIG. 4 and denoted generally by the refeence letter C, the joint plane separating this final drive casing from the engine crankcase (not shown) being designated by the reference letter F in FIG. 5.

Inside the casing these sections 22a, 22b are formed with integral cast partitions 13a, 14a providing half housing on the one hand for the bearings 30, 31 of the transmission output shaft 6a, which bearings carry therebetween the gear 7 of the above-mentioned intermediate gear couple 7, 8, and on the other hand for the bearings 40, 41 of the shaft of the final drive driving pinion 9.

FIG. 4 further shows a convenient mounting of the tachometer drive comprising helical gears 28, 29 having their axes at right angles to each other, the driving gear 28 being mounted directly, using neither key nor tightening nut, on the output shaft 6a of the transmission, as it is clamped with the gear 7 of a gear couple 7, 8 between the two bearings 30 and 31 provided for mounting the output shaft.

As shown in FIG. 6, another drive or power take-off is provided by means of a toothed extension 29a of gear 29 constituting an integral part of a tachometer drive 32 carried by one of the half casings, the driven pinion 33 of this other drive being carried by the other half casing. Thus, for example, the tachometer drive 32 is provided in this case for cotrolling the gear change and the other drive 33 is used for driving the speedometer cable.

It is clear that the arrangement of the joint plane for assembling the two casing sections of the final drive and of the joint plane between the transmission and the final drive will greatly facilitate the assembling and positioning of the component elements of these mechanisms in the casing, and also of the drives and power take-off which can be constructed in the form of assembled and preadjusted units.

Figure 7:
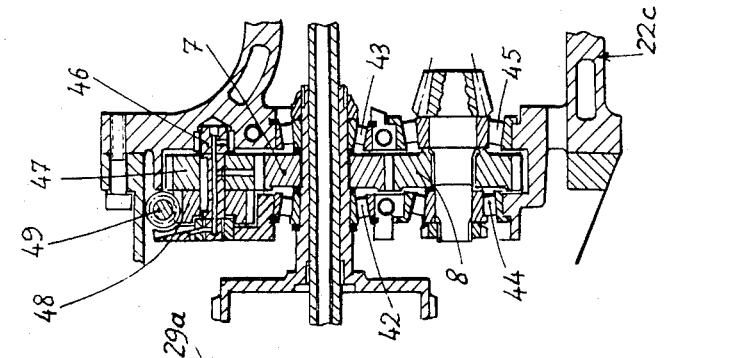
FIG. 7 is a fragmentary sectional view showing a modified mounting of a tachometric drive.

Referring to FIG. 7, it will be seen that in addition to the bearings 32, 43 of the transmission output shaft and 44, 45 of the shaft carrying the driving pinion of the final drive, a tachometric device is mounted in housing consisting of two parts disposed on either side of the joint plane of the final drive casing halves 22a and carry the bearings of an intermediate shaft 46 having mounted thereon a helical gear 47 driven from the gear 7 of the intermediate gear couple 7, 8, mounted on the transmission output shaft, and another helical pinion 48 driving through the medium of a small helical pinion 49 a tachometric device (alternator, generator, hydraulic tachometer, etc.) as well as the drive for the tachometer mounted on the instrument panel of the vehicle.

The construction according to this invention is applicable not only to automatic transmissions in which all the component elements necessary for controlling the transmission can advantageously be assembled, due to the provision of the detachable transmission casing, but also to semi-automatic and manually-controlled transmissions.

What is claimed is:

1. A transmission and final drive unit for an automotive vehicle, comprising a composite casing formed by a transmission casing and a final drive casing assembled along a joint plane extending at right angles to the longitudinal axis of the unit, said final drive casing comprising two sections the joint plane of which lies along said longitudinal axis, at least one section of said two-section final drive casing having two inner partitions constituting supports for bearings of a pair of intermediate gears one of which is rotatably solid with bevel gearing of the final drive and the other of which is rotatably solid with an output shaft of the transmission.

2. A transmission and final drive unit according to claim 1, in which said final drive casing is shaped to be secured to an engine crankcase and to enclose a device connecting an engine to said unit, and reinforcing ribs distributed along substantially the whole of its length.

3. A transmission and final drive unit according to claim 2, in which said reinforcing ribs are formed along the joint plane of said two final drive casing sections.

4. A transmission and final drive unit according to claim 2, further comprising ribs formed to locally reinforce the final drive casing sections enclosing said device connecting the engine to said unit.

5. A transmission and final drive unit according to claim 1, in which both sections of said final drive casing are formed with inner transverse partitions provided with matching half-housings for mounting final drive component elements in said casing.

6. A transmission and final drive unit according to claim 5, in which said matching half-housings are adapted to receive means for driving a tachometric device.

7. A transmission and final drive unit according to claim 1, further comprising means for mounting a tachometric drive on each of the two final drive casing sections whereby a driven member of one of the tachometric drives engages a driving member mounted within said casing and has an extension constituting at the same time the driving member of the other tachometric drive.

References Cited

UNITED STATES PATENTS

| | | | |
|---|---|---|---|
| 3,113,471 | 12/1963 | Gregory | 74—701 |
| 3,263,521 | 8/1966 | Muller | 74—606 |

FRED C. MATTERN, Jr., Primary Examiner

F. D. SHOEMAKER, Assistant Examiner